United States Patent
Klopf et al.

(10) Patent No.: US 8,375,796 B2
(45) Date of Patent: Feb. 19, 2013

(54) SENSOR ASSEMBLAGE AND METHOD FOR MANUFACTURING A SENSOR ASSEMBLAGE

(75) Inventors: Frank Klopf, Waldbuettelbrunn (DE); Arno Stoetzler, Reutlingen (DE); Juergen Kober, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 774 days.

(21) Appl. No.: 12/555,587

(22) Filed: Sep. 8, 2009

(65) Prior Publication Data

US 2010/0058873 A1    Mar. 11, 2010

(30) Foreign Application Priority Data

Sep. 10, 2008  (DE) .................... 10 2008 041 943

(51) Int. Cl.
*G01L 7/08*  (2006.01)
(52) U.S. Cl. ........................................... 73/715
(58) Field of Classification Search .................... 73/715, 73/716
See application file for complete search history.

(56) References Cited

U.S. PATENT DOCUMENTS

| | | | | |
|---|---|---|---|---|
| 4,222,277 A | * | 9/1980 | Kurtz et al. ............. | 73/721 |
| 5,569,856 A | * | 10/1996 | Jacobs-Cook ............. | 73/702 |
| 7,040,172 B2 | * | 5/2006 | Moelkner et al. ............. | 73/706 |
| 7,055,392 B2 | * | 6/2006 | Muchow et al. ............. | 73/715 |
| 7,093,493 B2 | * | 8/2006 | Benzel et al. ............. | 73/715 |
| 7,343,806 B2 | * | 3/2008 | Muchow et al. ............. | 73/715 |
| 7,802,481 B2 | * | 9/2010 | Henn et al. ............. | 73/715 |
| 8,074,521 B2 | * | 12/2011 | Kurtz et al. ............. | 73/716 |
| 2005/0000292 A1 | * | 1/2005 | Muchow et al. ............. | 73/715 |
| 2006/0027025 A1 | * | 2/2006 | Ueno ............. | 73/715 |
| 2012/0073379 A1 | * | 3/2012 | Ahles et al. ............. | 73/715 |

FOREIGN PATENT DOCUMENTS

DE    10 2005 027 365    12/2006

* cited by examiner

*Primary Examiner* — Freddie Kirkland, III
(74) *Attorney, Agent, or Firm* — Kenyon & Kenyon LLP

(57) ABSTRACT

A sensor assemblage, in particular a high-pressure sensor assemblage, includes a substrate element and a connector element, the substrate element comprising a sensor structure having a pressure-sensitive diaphragm and a cavity disposed in the region of the diaphragm, the substrate element being connected to the connector element in such a way that the cavity is connected to a hollow space of the connector element, the substrate element moreover including at least one further sensor structure having a pressure-sensitive further diaphragm and a further cavity disposed in the region of the further diaphragm, the further cavity being connected to a further hollow space of the at least one connector element or of a further connector element.

16 Claims, 1 Drawing Sheet

SENSOR ASSEMBLAGE AND METHOD FOR MANUFACTURING A SENSOR ASSEMBLAGE

RELATED APPLICATION INFORMATION

The present application claims priority to and the benefit of German patent application no. 10 2008 041 943.5, which was filed in Germany on Sep. 10, 2008, the disclosure of which is incorporated herein by reference.

FIELD OF THE INVENTION

The present invention proceeds from a sensor assemblage and method for manufacturing a sensor assemblage.

BACKGROUND INFORMATION

There are various sensor assemblages. German patent document DE 10 2005 027 365 A1, for example, discusses a high-pressure sensor device, the high-pressure sensor device having a pressure sensor element that has a diaphragm deformable under the influence of pressure and a functional layer, a pressure space being disposed in the region of the diaphragm and the functional layer modifying an electrical property upon deformation. The functional layer encompass for that purpose a piezoresistive material such as, for example, a NiCrSi alloy. The latter produces, upon a deformation consequent to a change in pressure in the pressure space, a change in resistance or a piezovoltage that is picked off and measured. Sensors of this kind are used predominantly in the motor vehicle sector, in direct fuel injection systems and in hydraulics for vehicle dynamics regulation. A disadvantage of this high-pressure sensor device is that a separate sensor assemblage having a respective pressure sensor element is required for each pressure to be measured.

SUMMARY OF THE INVENTION

The sensor assemblage according to the exemplary embodiments and/or exemplary methods of the present invention, and the method according to the present invention for manufacturing a sensor assemblage, in accordance with the coordinated claims have, as compared with the existing art, the advantage that in a comparatively small physical space using only a single sensor assemblage, a plurality of, in particular, pressures differing from one another are substantially simultaneously measurable and are particularly easily connectable, with the result that considerable manufacturing and/or assembly cost can be eliminated. This is achieved by the fact that both the diaphragm having the cavity, and the further diaphragm having the further cavity, are implemented in the one substrate element, so that as a result of a connection of the substrate element to the connector element or to a further connector element, the cavity can be connected to the hollow space, and the further cavity to the further hollow space, in particularly simple fashion.

The one substrate element thus enables, in particular, multi-channel measurement of a plurality of pressure lines connected via the connector element or via the further connector element; in the case where the first pressure space is separated from the second pressure space, a first pressure is measurable in the first pressure space by way of the diaphragm, and a second pressure is measurable in the second pressure space by way of the further diaphragm. The first and the second pressure space are connectable, for example via the connector element and the further connector element, simultaneously to a first and a second hydraulic line of a vehicle controller. A pressure-equalizing connection between the first and the second pressure space is alternatively conceivable, so that by way of the sensor structure and the further sensor structure, reciprocal monitoring of the sensor structure and the further sensor structure in the context of measurement of a substantially identical first and second pressure on a single substrate element is enabled. This is of considerable advantage, for example, in the case of safety-relevant functions, for example when the sensor assemblage is used in vehicle hydraulics, since erroneous pressure measurements are immediately detectable. When pressure sensors are integrated, for example, into electrohydraulic braking systems (ESP systems), a plurality of different brake pressures may be measured, for example the brake pressure in the main brake cylinder and the brake pressures at the various axles and/or at the individual wheels, so that particularly, a plurality of further sensor structures may be implemented on the substrate element and thus the plurality of different brake pressures for the entire ESP system are measurable using only a single substrate element. Especially when the sensor assemblage is integrated into an ESP system, the plurality of brake pressures to be measured are conveyed via hydraulic lines to the plurality of sensor structures of the one substrate element.

In particular, the substrate element can be connected in particularly simple fashion, by the connector element and/or by the further connector element, to a hydraulic unit of, in particular, the ESP system. In addition to the reduced manufacturing and assembly costs, economization of physical space and wiring complexity in the vehicle are thereby achieved. The sensor assemblage is provided in particular for installation in vehicle areas at which a plurality of hydraulic lines come together in a comparatively small space, for example at a hydraulic unit of the ESP systems and/or in the context of sensor arrays of electrohydraulic braking (EHB) systems. Utilization in fuel injection systems would likewise be conceivable. In addition, the method according to the present invention for manufacturing the sensor assemblage enables manufacture thereof in a processed large-scale substrate, thereby greatly reducing the manufacturing costs of the sensor assemblage.

Advantageous embodiments of the invention may be gathered from the present description and with reference to the drawings.

According to a refinement, provision is made that the substrate element and the further substrate element are each connected to the connector element or to the further connector element by way of an intermaterial, nonpositive, and/or positive connection, so that a mechanically stable and at the same time comparatively economically manufacturable connection can advantageously be implemented between the substrate element and the connector element, or between the substrate element and the further connector element. Particularly advantageously, a plurality of pressure lines are connected to the corresponding plurality of diaphragms solely by the connection between the substrate element and the connector element, or between the substrate element and the further connector element.

According to a further refinement, provision is made that an adapter piece and/or a further adapter piece are disposed between the substrate element and the connector element, the cavity may be connected to the hollow space by way of the adapter piece, and/or the further cavity being connected to the further hollow space by way of the further adapter piece, and particularly, the further structures encompassing the adapter piece and/or the further adapter piece, so that advantageously, in particularly simple fashion, a connection can be created between the substrate element and the connector element and/or between the substrate element and the further connector element by way of the adapter element and/or the further adapter element.

According to a further refinement, provision is made that the sensor assemblage has further structures that may be disposed rotationally symmetrically around the diaphragm and/or rotationally symmetrically around the further diaphragm so that, particularly advantageously, further sensor structures and/or connecting structures can thereby be implemented on the substrate element.

According to a further refinement, provision is made that the sensor assemblage has an evaluation circuit that is provided both for evaluation of the sensor signal and for evaluation of the further sensor signal. Particularly, the sensor structures and the further sensor structures of the sensor assemblage may thus be evaluated, which may be in parallel or serial fashion, and particularly which may be in continuous or clocked fashion, with only a single evaluation circuit. This is promoted in particular by the fact that the sensor structures and the further sensor structures are implemented on only a single substrate element, so that for evaluation of the sensor structures and further sensor structures, the evaluation circuit needs to be connected only to the one substrate element. Particularly, the evaluation circuit may be monolithically integrated into the substrate element.

A further subject of the exemplary embodiments and/or exemplary methods of the present invention is a method for manufacturing a sensor assemblage, in a first manufacturing step a plurality of substrate elements being manufactured on a substrate, in a second manufacturing step at least one substrate element being detached from the substrate, and in a third manufacturing step the substrate element being connected to a connector element, and which may be to a further connector element, in such a way that the cavity is connected to a hollow space of the connector element, and the further cavity to a further hollow space of the connector element or of the further connector element. Particularly advantageously, the plurality of substrate elements thus may be manufactured substantially simultaneously on a single large-scale substrate, and the substrate elements are then singulated, so that individual carrier elements are not required in the manufacture of individual substrate elements, and manufacturing costs are substantially lowered as compared with the existing art.

In addition, particularly advantageously, a plurality of substrate elements are manufactured simultaneously, with the result that production times are shortened. In the first manufacturing step, the cavities and the further cavities are introduced into the substrate which may be by way of a drilling operation. In addition, the first and the second pressure space are connected to the hollow space and to the further hollow space, so that by way of the sensor structure and the further sensor structure, one pressure can be measured in the hollow space and a further pressure in the further hollow space.

According to a further refinement, provision is made that in the first manufacturing step, further structures are manufactured on the substrate, the further structures may be manufactured in substantially rotationally symmetrical fashion around the diaphragm and/or around the further diaphragm, and/or the further structures may be manufactured by milling, casting, pressing, press-fitting, adhesive bonding, soldering, and/or welding. The further structures are thus, particularly advantageously, manufacturable on the plurality of substrate elements in the large-scale substrate using comparatively economical and easily managed processes.

According to a further refinement, provision is made that in the second manufacturing step, a singulation of the substrate element by way of a laser cutting process is carried out. This enables, in particularly advantageous fashion, comparatively precise singulation of the substrate elements, the dimensions of the substrate elements being, in particular, precisely determined and moreover, in advantageous fashion, the release of sawing particles during the singulation process being minimized.

According to a further refinement, provision is made that the third manufacturing step is carried out by adhesive bonding, solder bonding, and/or press-fitting, and/or that in the third manufacturing step, the cavity and the hollow space are connected to one another by way of an adapter piece and/or the further cavity and the further hollow space are connected to one another by way of a further adapter piece, the further structures may encompass the adapter piece and/or the further adapter piece. Particularly advantageously, a connection between the substrate element and the connector element and/or the further connector element is thus created, in a manner achievable comparatively simply and economically, by way of the adapter piece and/or the further adapter piece. In particular, the adapter pieces make possible a compensation for fabrication tolerances in the substrate element or in the connector elements.

Exemplifying embodiments of the invention are depicted in the drawings and are explained further in the description that follows.

DETAILED DESCRIPTION

Figure 1A:
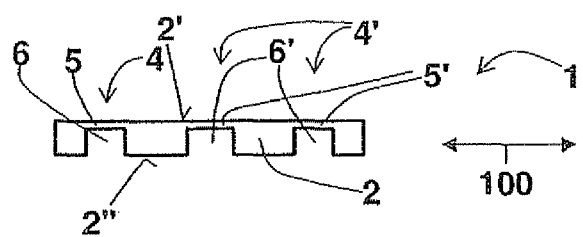
FIG. 1a is a schematic side view of a sensor assemblage according to a first exemplary embodiment of the present invention.

FIG. 1A is a schematic side view of a sensor assemblage 1 according to a first exemplary embodiment of the present invention, sensor assemblage 1 having a substrate element 2 having a main extension plane 100, a first side 2' parallel to main extension plane 100, and second side 2" parallel to main extension plane 100. Substrate element 2 further has a sensor structure 4 having a cavity 6 on second side 2" which extends into substrate element 2 perpendicular to main extension plane 100, and a diaphragm 5, disposed substantially congruently with cavity 6 perpendicular to main extension plane 100, on first side 2'. Sensor assemblage 1 has two further sensor structures 4' of substantially identical design, respectively parallel to main extension plane 100 of sensor structure 4 and spaced apart from one another, each having a further cavity 4' on second side 2" and a congruent further diaphragm 5' on first side 4'.

Cavity 4 and the two further cavities 4' thus define a first, second, and third pressure space, a pressure change in the first, second, and third pressure space causing a deformation of the corresponding diaphragm 4, 4', and the deformation respectively generating, by way of a piezoresistive material (not illustrated) on first side 2' of the respective diaphragm 4, 4', a first, second, and third sensor signal as a function of the pressure in the first, second, and third pressure space. For the manufacture of substrate element 2, in a first manufacturing step a plurality of substrate elements 2 each having a plurality of sensor structures 4, 4' are manufactured on a substrate (not illustrated) in the form of a large-scale wafer, and in a subsequent second step, substrate elements 2 are singulated by way of a laser cutting process.

Figure 1B:
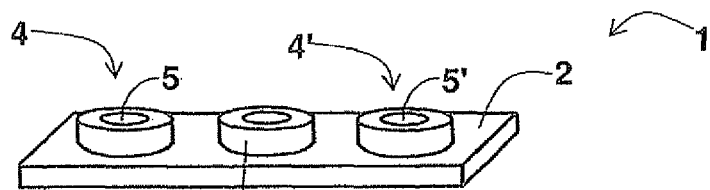
FIG. 1b is a schematic perspective view of a sensor assemblage according to a second exemplary embodiment of the present invention.

FIG. 1B is a schematic perspective view of a sensor assemblage 1 according to a second exemplary embodiment of the present invention, the second exemplary embodiment being substantially identical to the first exemplary embodiment depicted in FIG. 1*a*, further structures 8 additionally being disposed, concentrically around diaphragms 4, 4', on first side 2'.

Figure 1C:
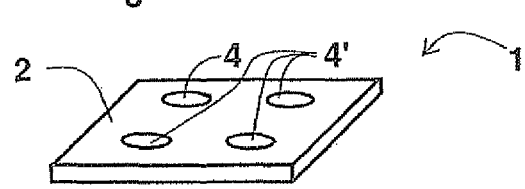
FIG. 1c is a schematic perspective view of a sensor assemblage according to a third exemplary embodiment of the present invention.

FIG. 1*c* is a schematic perspective view of a sensor assemblage 1 according to a third exemplary embodiment of the present invention, the third exemplary embodiment being substantially identical to the first exemplary embodiment depicted in FIG. 1*a*, a total of four sensor structures 4, 4' being disposed in two rows and two columns on substrate element 2.

Figure 2:
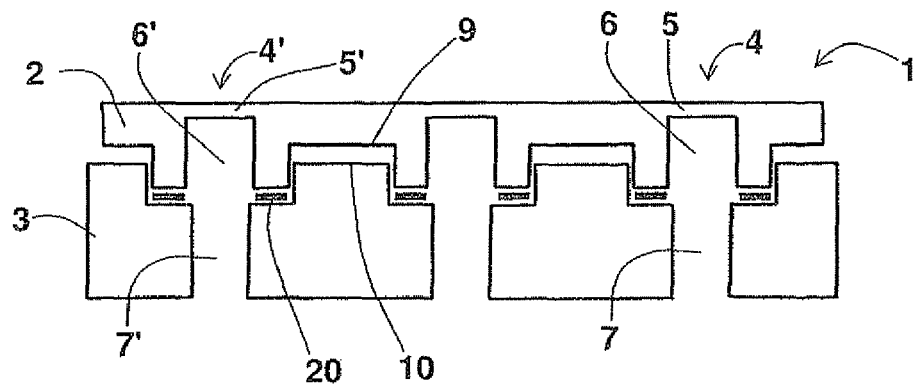
FIG. 2 is a schematic side view of a sensor assemblage according to a fourth exemplary embodiment of the present invention.

FIG. 2 is a schematic side view of a sensor assemblage 1 according to a fourth exemplary embodiment of the present invention, the fourth exemplary embodiment being substantially identical to the first exemplary embodiment depicted in FIG. 1*a*, substrate element 2 being disposed with second side 2" on a connector element 3 and having an intermaterial connection thereto. The intermaterial connection is produced by way of a connecting element 20 that is disposed at least partly perpendicular to main extension plane 100 between second side 2" and connector element 3, and in particular encompasses a solder or an adhesive. Substrate element 2 is consequently, in a third manufacturing step, which may be soldered or adhesively bonded onto connector element 3. Cavity 4 is connected to a hollow space 7 in connector element 3, and further cavities 4' are connected to further hollow spaces 7' in connector element 3, so that a pressure equalization is produced between the pressure spaces in substrate element 2 and hollow spaces 7, 7', and the pressures in hollow spaces 7, 7' are thus measurable by way of sensor structures 4, 4'.

Substrate element 2 has, on second side 2", grooves 9 between cavities 6, 6' that are provided for the reception of lands 10 on connector element 3 so that, in particular, the relative position between substrate element 2 and connector element 3 parallel to main extension plane 100 is defined substantially by the engagement of lands 10 into grooves 9.

Figure 3:
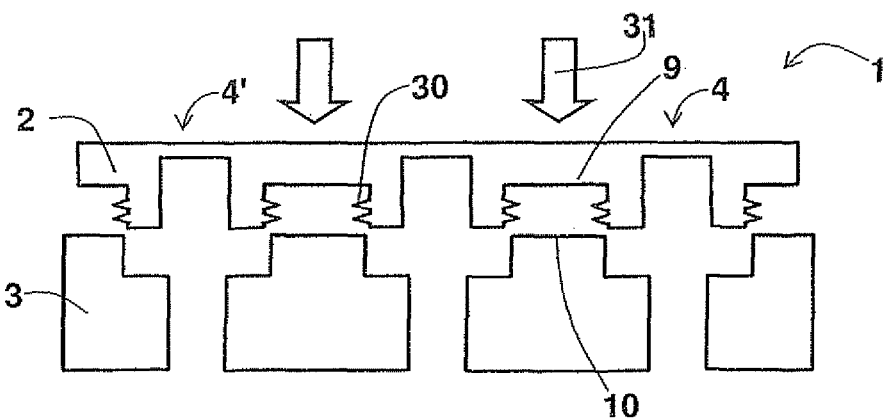
FIG. 3 is a schematic side view of a sensor assemblage according to a fifth exemplary embodiment of the present invention.

FIG. 3 is a schematic side view of a sensor assemblage 1 according to a fifth exemplary embodiment of the present invention, the fifth exemplary embodiment being substantially identical to the fourth exemplary embodiment depicted in FIG. 2, latching elements 30 being embodied on inner sides 9' of grooves 9, such that in the third manufacturing step, instead of the intermaterial connection, a nonpositive connection between substrate element 2 and connector element 3 is constituted, which latter connection is produced by a force impingement 31 on substrate element 2 in the direction of connector element 3, and a simultaneous press-fitting of latching elements 30 to lands 10.

What is claimed is:

1. A sensor assemblage, comprising:
    a substrate element; and
    a connector element;
    wherein the substrate element includes a sensor structure having a pressure-sensitive diaphragm and a cavity disposed in a region of the diaphragm,
    wherein the substrate element is connected to the connector element so that the cavity is connected to a hollow space of the connector element,
    wherein the substrate element further includes at least one further sensor structure having a pressure-sensitive further diaphragm and a further cavity disposed in the region of the further diaphragm, and
    wherein the further cavity is connected to a further hollow space of the at least one connector element or of a further connector element,
    wherein lands of the connector element engage the cavity.

2. The sensor assemblage of claim 1, wherein the substrate element and a further substrate element are each connected to the connector element or to the further connector element by at least one of an intermaterial connection, a nonpositive connection, and a positive connection.

3. The sensor assemblage of claim 1, wherein at least one of an adapter piece and a further adapter piece are disposed between the substrate element and the connector element.

4. The sensor assemblage of claim 1, wherein the sensor assemblage includes structures that are disposed at least rotationally symmetrically around the diaphragm and rotationally symmetrically around the further diaphragm.

5. The sensor assemblage of claim 1, further comprising:
    an evaluation circuit for evaluating a deflection motion of the diaphragm and for evaluating a further deflection motion of the further diaphragm.

6. The sensor assemblage of claim 1, wherein the sensor assemblage is a high-pressure sensor assemblage.

7. The sensor assemblage of claim 1, wherein at least one of an adapter piece and a further adapter piece are disposed between the substrate element and the connector element, and wherein at least one of the cavity is connected to the hollow space by the adapter piece, and the further cavity is connected to the further hollow space by the further adapter piece.

8. The sensor assemblage of claim 1, wherein at least one of an adapter piece and a further adapter piece are disposed between the substrate element and the connector element, wherein at least one of the cavity is connected to the hollow space by the adapter piece, and the further cavity is connected to the further hollow space by the further adapter piece, and wherein the further structures encompass at least one of the adapter piece and the further adapter piece.

9. The sensor assemblage of claim 1, wherein the lands of the connector element engage the cavity between grooves of the substrate element.

10. The sensor assemblage of claim 1, wherein the lands of the connector element engage the cavity via latching elements of the substrate element.

11. A method for manufacturing a sensor assemblage, the method comprising:
    providing a plurality of substrate elements on a substrate;
    detaching at least one substrate element from the substrate; and
    connecting the substrate element to a connector element, so that a cavity is connected to a hollow space of the connector element, and a further cavity is connected to a further hollow space of the connector element or of the further connector element;
    wherein the sensor assemblage includes at least one of the substrate elements and the connector element,
    wherein the substrate element includes a sensor structure having a pressure-sensitive diaphragm and a cavity disposed in the region of the diaphragm, and
    wherein the substrate element further includes at least one further sensor structure having a pressure-sensitive further diaphragm and a further cavity disposed in the region of the further diaphragm,
wherein lands of the connector element engage the cavity.

12. The method of claim 11, wherein during the providing, further structures are provided on the substrate, the further structures being manufactured preferably in substantially rotationally symmetrical fashion at least one of around the diaphragm and around the further diaphragm, and wherein the further structures are preferably made by at least one of milling, casting, pressing, press-fitting, adhesive bonding, soldering, and welding.

13. The method of claim 11, wherein during the detaching, a singulation of the substrate element is performed by a laser cutting process.

14. The method of claim 11, wherein at least one of the following is satisfied: (i) the connecting is performed by at least one of adhesive bonding, solder bonding, and press-fitting; and (ii) during the connecting, at least one of the cavity and the hollow space are connected to one another by an adapter piece, and the further cavity and the further hollow space are connected to one another by a further adapter piece.

15. The method of claim 11, wherein at least one of the following is satisfied: (i) the connecting is performed by at least one of adhesive bonding, solder bonding, and press-fitting; and (ii) during the connecting, at least one of the cavity and the hollow space are connected to one another by an adapter piece, and the further cavity and the further hollow space are connected to one another by a further adapter piece, and wherein the further structures encompass at least one of the adapter piece and the further adapter piece.

16. The method of claim 11, wherein the substrate element is also connected to a further connector element.

* * * * *